(12) United States Patent
Chaney (10) Patent No.: US 6,662,479 B2
(45) Date of Patent: Dec. 16, 2003

(54) TREE AND STUMP REMOVAL

(76) Inventor: Sam R. Chaney, 403 Buffalo La., San Angelo, TX (US) 76901

( * ) Notice: Subject to any disclaimer, the term of this patent is extended or adjusted under 35 U.S.C. 154(b) by 0 days.

(21) Appl. No.: 10/245,807

(22) Filed: Sep. 18, 2002

(65) Prior Publication Data

US 2003/0014886 A1 Jan. 23, 2003

Related U.S. Application Data

(63) Continuation-in-part of application No. 09/776,113, filed on Feb. 5, 2001, now abandoned.

(51) Int. Cl.[7] .......................... A01B 13/00; A01G 23/06
(52) U.S. Cl. ............................ 37/301; 37/302; 172/699
(58) Field of Search ................... 37/302, 301, 303, 37/403, 468; 172/82, 50, 699, 720; 144/334, 336

(56) References Cited

U.S. PATENT DOCUMENTS

| | | | | |
|---|---|---|---|---|
| 1,687,986 A | * | 10/1928 | Miller | 172/381 |
| 2,295,458 A | | 9/1942 | Edwards | 37/2 |
| 2,302,801 A | * | 11/1942 | Powelson | 37/302 |
| 2,303,415 A | | 12/1942 | Williams | 37/2 |
| 2,650,063 A | | 8/1953 | Hawkins | 254/132 |
| 2,703,044 A | * | 3/1955 | Adair | 111/101 |
| 2,770,076 A | * | 11/1956 | Kluckhohn | 47/58.1 R |
| 2,864,297 A | * | 1/1958 | Adams | 172/376 |
| 2,877,572 A | * | 3/1959 | Dyess | 37/302 |
| 3,048,229 A | * | 8/1962 | Simpson | 172/698 |
| 3,101,794 A | * | 8/1963 | Bechman | 172/698 |
| 3,595,286 A | * | 7/1971 | Coffey | 144/34.1 |
| 3,635,269 A | * | 1/1972 | Price | 144/336 |
| 4,028,823 A | * | 6/1977 | Edwards et al. | 37/452 |
| 4,204,348 A | * | 5/1980 | Lydie | 37/404 |
| 4,244,560 A | | 1/1981 | Hawkins | 254/132 |
| 4,321,761 A | | 3/1982 | Hedblom | 37/2 |
| 4,895,211 A | * | 1/1990 | Harris | 172/271 |
| 5,133,268 A | * | 7/1992 | Delisle | 37/302 |
| 5,180,142 A | | 1/1993 | Nowlin | 254/132 |
| 5,490,340 A | | 2/1996 | Muncy | 37/301 |
| 5,529,130 A | * | 6/1996 | Suk | 172/380 |
| 6,035,562 A | * | 3/2000 | Virnig et al. | 37/302 |
| 6,276,463 B1 | * | 8/2001 | Hollimon et al. | 172/699 |
| 6,279,665 B1 | * | 8/2001 | Devaney | 172/19 |
| 6,341,933 B1 | * | 1/2002 | Gagnon et al. | 414/725 |

* cited by examiner

Primary Examiner—Robert F. Pezzuto
Assistant Examiner—Thomas A. Beach
(74) Attorney, Agent, or Firm—Christopher J. Whewell (57) ABSTRACT

Provided herein is a device which is useful in removing trees, stumps, and the like from various landscapes. A device according to the invention may be attached to existing earthmoving equipment, preferably in the place of a conventional bucket used on a track driven or tractor mounted backhoe attachment or other functional portion of a hydraulic excavator that is adapted to receive a bucket. A device according to the present invention may be caused to be operated beneath the surface of the ground, as in cases where it is desired to remove root masses and whole trees, such as mesquite and other species. In an alternate embodiment, a device according to the invention is useful above-ground for grasping small cedar trees and the like by grasping sabres affixed to the device. Methods for the use of such devices are provided.

18 Claims, 11 Drawing Sheets

TREE AND STUMP REMOVAL

CROSS-REFERENCES TO RELATED APPLICATIONS

The present application is a Continuation-In-Part of U.S. patent application Ser. No. 09/776,113 filed on Feb. 05, 2001, now abandoned currently still pending, the entire contents of which are herein incorporated fully by reference thereto.

TECHNICAL FIELD

The present invention relates generally to an apparatus for removing trees or stumps and method associated with its use. More particularly it relates to a tree or stump removing apparatus for connection to an earth working apparatus such as an hydraulic excavator or other motorized heavy equipment used for conveyance in the ground breaking or farm industry.

BACKGROUND OF THE INVENTION

Stump cutter devices are well known devices that are used to remove tree stumps and sometimes trees from the earth. Known stump cutters are commercially available in a wide variety of sizes and configurations from various manufacturers. Stump cutters and tree removers are available in a trailer configuration where the stump cutter is pulled behind a truck or similar vehicle, in a self-propelled configuration, where the stump cutter includes wheels or tracks and as an attachment adapted to be received by a backhoe attachment on a tractor or the like.

Tree and stump removal is often needed on tracts of land that have been cleared of other obstructions. Often, a large amount of excavation is occurring on the tract of land in conjunction with the tree removal. In light of the presence of one or more excavators or other earth movers at these sites, it has been proposed in the case of stump cutting apparati to provide a such an apparatus that releasably attaches to the boom of an excavator or similar apparatus such that a separate, self-contained stump cutter or removal tool is not needed.

Known stump cutter or removal attachments that releasably connect to the end of a boom of an excavator have not proven to be satisfactory, especially where a large amount of stumps or trees must be cleared from a wide area of land, particularly in the cases of cedar and mesquite trees in the American Southwest. Existing devices rely upon the excavator to continuously maneuver the cutting assembly, and to apply the force needed to engage the assembly with the stump or tree, and are configured such that the operator of the excavator is often unable to see the base portion of the tree or stump and the cutting or removal operations thereon as they occur. Known stump cutters for attachment to excavators and other earth movers are configured such that the operator can be exposed to flying debris, and such that the control of the movement of the cutting assembly is difficult, especially in light of the fact that the movement of the entire excavator, boom, or both must be utilized to move the cutting assembly during cutting operations. The control of an earth mover and stump cutter in this manner to remove a stump is very difficult. In addition, the removal of a stump, especially when repeated numerous times as often required, using an earth mover with known stump cutting attachments, can place a large strain on the earth mover causing excessive wear and tear of the earth mover and associated equipment. Upon encountering a tree or stump, the cutting assemblies of these known attachments transmit large forces back through the frame and other components of the prime mover—e.g., through the boom of the excavator, and can cause excessive wear on these components. Also, with known tree removing apparati and stump cutter designs for attachment to an earth mover, the earth mover and its associated hydraulics are utilized to force the cutting or remover assembly into the stump or tree.

U.S. Pat. No. 2,295,458 teaches a combination useful for uprooting trees which includes a tractor, and a frame mounted on the tractor that extending forwardly therefrom. The frame has forwardly-opening sockets at its front end portion. Detachably mounted in the sockets is a an engaging means that is adapted to engage trees and the like, and apply a bending action thereto, upon forward motion of the tractor. A blade is carried by the frame, which blade is disposed rearwardly of the forward end portion of the engaging means, in a position to pass through the soil beneath the surface of the soil to loosen the roots of the tree that is bearing against the engaging means.

U.S. Pat. No. 2,303,415 discloses a shovel which includes a boom having a dipper stick disposed on the boom for actuation in the vertical plane of the boom. There is a ground-clearing fork mounted on the lower end of the stick, wherein the fork comprises a frame structure and a plurality of parallel socket-forming members affixed in the frame. The socket comprises teeth mounted in it which form members that extend from the lower edge of the frame in the same plane and in the same general direction as the line of the dipper stick.

U.S. Pat. No. 2,650,063 sets forth a grubber for trucks comprising a beam having an inner end pivotally attached to a truck and an outer end contacting the ground, the beam being hinged intermediate its ends, means for maintaining the hinge point of the hinge above a line drawn between the contact point of the beam with the ground and its pivot point with the truck, and force-transmitting means on the beam between the outer end and the hinge point, the beam breaking upwardly on application of force to the pivoted inner end.

U.S. Pat. No. 3,635,269 provides a tree cutter comprising a frame, an adjustable suspension means on the frame for connecting the frame to a prime mover. The suspension means swings the frame in a predetermined direction. The frame includes a substantially flat cutting blade that extends from one side of the frame to an opposite side thereof and having a cutting edge formed thereon, for shearing engagement with a tree when the frame is swung in the predetermined direction for impact with the tree.

U.S. Pat. No. 4,244,560 teaches a tree remover having a gripper including a V-shaped wedging member with a blade projecting inwardly thereof for cutting into a portion of the tree above the roots forming a shelf with adjacent fibers of the tree compressed between the wedging members, and means for exerting an upward force on the gripper by exerting a compressive force between ground engaging support members and an elevatable frame from which the gripper depends. It has an elongated arm pivotally carried by a vehicle on one end thereof and extending forwardly and downwardly therefrom, a first fluid power operated cylinder means connected to the elongated arm intermediate the ends thereof for raising and lowering same, a tiltable supporting frame having a lower inner end pivotally carried upon a free end of the elongated arm and a lower forward end supportable upon the ground, a second fluid power operated cylinder means pivotally connected to the tiltable frame for imparting tilting movement thereto, an elevatable frame member having pivotal connection adjacent an upper rearward portion of the tiltable frame, a tree-gripping means carried by the elevatable frame extending forwardly thereof, and a pair of transversely aligned power operated cylinders. There is a pivotal mounting between a forward lower end of the tiltable frame and forward portion of the elevatable frame member.

U.S. Pat. No. 4,321,761 discloses a device for breaking loose tree stumps from the ground that comprises a vehicle, an arm or the like carried by the vehicle and a tool carried by the arm and engageable with a stump. The tool comprises at least two members movable relative to each other when the tool has been located in an uprooting position relative to the stump. One of the members is adapted to rest against the ground while the tool may lift the stump by means of the relative movement of the members. The tool is pivotally connected to the arm and comprises a claw, which may be introduced under portions of the stump, and a support member for application against the ground, the support member being movable relative to the claw, a pressure exerting means connected to the support member being adapted to press the support member against the ground, while the claw is introduced under the stump, in order to cause the claw to move upwardly, thereby breaking loose the stump from the ground. The improvement of this invention over the prior art is that the support member is pivotally connected to the claw about an axis spaced from the pivotal connection of the tool to the arm.

U.S. Pat. No. 5,180,142 sets forth a device for uprooting trees and brush. The device is rigidly constructed of quarter inch rectangular tubing and comprises a substantially horizontal V-shaped tree-engaging member that preferably has elongate blades thereon for gripping the trunk of the tree to be uprooted. An upper Y-shaped member, extending over the tree engaging member, may be included for supporting the upper part of the tree being uprooted. The device is used by attaching it to a truck or tractor or some other suitable vehicle and pushing the tree engaging member against the tree until it is forced out of the ground. The surrounding terrain is relatively undisturbed. The tree engaging member comprises a pair of rigid, laterally diverging arms. There is a frame for supporting the tree-engaging member, which frame comprises a horizontal portion and a vertical portion for connecting the device to a three-point hitch on a vehicle. The tree-engaging member is rigidly attached to the frame so as to be non-movable with respect to the frame, and the tree engaging member is supported substantially parallel to the ground when the frame is attached to the vehicle. The entire frame is rigid and non-jointed so that there is substantially no movement within the frame relative to the point of attachment to the vehicle or to the tree-engaging member during operation of the device.

U.S. Pat. No. 5,490,340 discloses a root grubber tool for brush which is attached to the boom of an excavator, such as, a track excavator or backhoe. The tool includes a framework which has a pair of side members which support, at the lower end thereof, a cutting blade with its leading edge swept inward and downward to accommodate centering the cutting blade on the roots and providing a deeper cut at the center than at the edges. The framework includes mounting arms to secure the tool onto the boom for working the tool, and may include a cross-support for assisting in gathering smaller brush. The lower edges of the side members are beveled to aid in the cutting operation. The tool may be maneuvered to depths of 18 to 24 inches to grub out the roots of the brush and secure it between the boom and the tool for displacement from the right-of-way. A device according to the invention comprises a spaced apart pair of arcuate side members, each having an upper end, a lower end and a leading edge at the lower end. There is a cutting blade with a leading edge mounted beneath the lower ends of the pair of arcuate side members extending outboard of the pair of arcuate side members. The cutting blade extends beyond the leading edges of the pair of arcuate side members and forms an obtuse angle therewith, and the cutting blade swept centrally inward relative to the leading edges of the pair of arcuate side members to form an obtuse angle along the leading edge of the cutting blade and swept centrally downward to form an obtuse angle with each of the pair of arcuate side members. There is a mounting section for attachment of the tool to the boom of the excavator secured between the upper ends of the pair of arcuate side members. A support plate extends between the pair of arcuate side members intermediate the mounting section and the cutting blade, and there is a pair of mounting brackets secured to the mounting section and the support plate. The mounting brackets are arranged to allow coupling of the root grubber tool to the excavator for arcuate movement of the tool relative to the boom and excavator.

U.S. Pat. No. 5,921,302 teaches a method and apparatus for removal of tree stumps, by first splitting the upper part of the stump with a splitting plate, and then utilizing a digging member to sever and/or dislodge roots of the stump from the ground strata. This apparatus is desirably provided as a splitting attachment to be connected to a bucket of a backhoe or trackhoe. Also, there is a saw plate mounted to the lower side of a splitting plate. First, the bucket is manipulated to have the saw plate cut a kerf in the upper part of the stump, and then the splitting member is moved through the kerf to split the stump. The stump sections that are removed have comparatively little dirt and rocks attached thereto, and these can be more easily burned, cut into chips, or transported. Thus, according to the invention there is a method to split and dislodge a tree stump from its ground embedded position, where the stump has an upper stump portion and a root system comprising roots extending from the upper stump portion into surrounding ground strata adjacent to the upper stump portion, comprising the steps of 1) providing a stump splitting and dislodging assembly comprising a stump splitting means having a leading edge and side splitting surface portions extending rearwardly from the leading edge and also comprising a stump dislodging means having a ground penetrating portion; 2) positioning and moving the stump splitting means of the assembly means to cause the leading edge to engage the upper stump portion and to split the upper stump portion along a substantially vertical splitting plane; and 3) after the upper stump portion is split, then positioning and moving the dislodging means to penetrate into the surrounding ground strata and sever the roots and/or separate the roots from the surrounding ground strata and thus dislodge the stump from its ground embedded engagement in the earth strata.

SUMMARY OF THE INVENTION

The present invention provides a device useful for removing trees, stumps or the like from the earth. It comprises a substantially rectangular, planar base portion having an upper surface, a lower surface, a first long side and a second long side. There is a v-shaped notch along one of the long sides. There is also a substantially v-shaped sub-base member that is attached to said lower surface of said base portion. A first vertical support portion and a second vertical support portion each project upwardly from the upper surface of the base portion. A device according to the invention further includes a first horizontal support member and a second horizontal support member, each of which have a first end portion and a second end portion, wherein the first end portion of the first horizontal support member is attached to the first vertical support portion and wherein the second end portion of the first horizontal support member is attached to the second vertical support portion. The first end portion of the second horizontal support member is attached to the first vertical support portion, and the second end portion of the second horizontal support member is attached to the second vertical support portion. There is a mounting means attached to said first and second horizontal support members, wherein the mounting means is adapted to be coupled to earthmoving equipment. A preferred form of the invention includes a first reinforcing member in the shape of a polygon having a plurality of faces that is attached to the first vertical support portion along one of its faces and is also attached to the base portion along one of its faces. There may also be a second reinforcing member in the shape of a polygon having a plurality of faces that is attached to the second vertical support portion along one of its faces and is also attached to the base portion along one of its faces.

A device according to the invention has the advantage over prior art devices, including that of Price as described in U.S. Pat. No. 3,635,269 above, in that a device according to the present invention does not cause a shearing of a portion of a tree or stump during its normal use. Rather, a device according to the present invention grasps a tree, or stump and pulls it directly from the ground in its normal use. Such feature is made possible in part owing to the fact that the mounting means of the present invention which is adapted to be coupled to earthmoving equipment is attached directly to both of its horizontal support members, as later described herein. Such feature has been found to lend to the overall longevity of a device according to the present invention, owing to effective elimination of impulsive forces experienced by the cutting blades of prior art devices during their normal use as a tool for causing a shearing effect on a target tree or stump, and the dulling of blades used on the prior art devices is not encountered in the present invention. Since the present invention does not employ a blade for the purposes of shearing, a device according to the present invention requires less maintenance than prior art devices.

The invention also includes a process for removing a tree, root, or stump comprising the steps of a) providing a device according to the invention attached to a hydraulic excavator or conventional backhoe; b) conferring motion on said device so as to cause it to move beneath the surface of the earth so that said v-shaped void contacts the roots of a tree or stump; c) continuing said motion until said roots are loosened substantially; and finally d) causing said device to emerge from the surface of the earth. The movements necessary to achieve these simple steps are well known to those skilled in the art of using common earthmoving equipment, such as a hydraulic excavator or backhoe.

DETAILED DESCRIPTION

Figure 1:
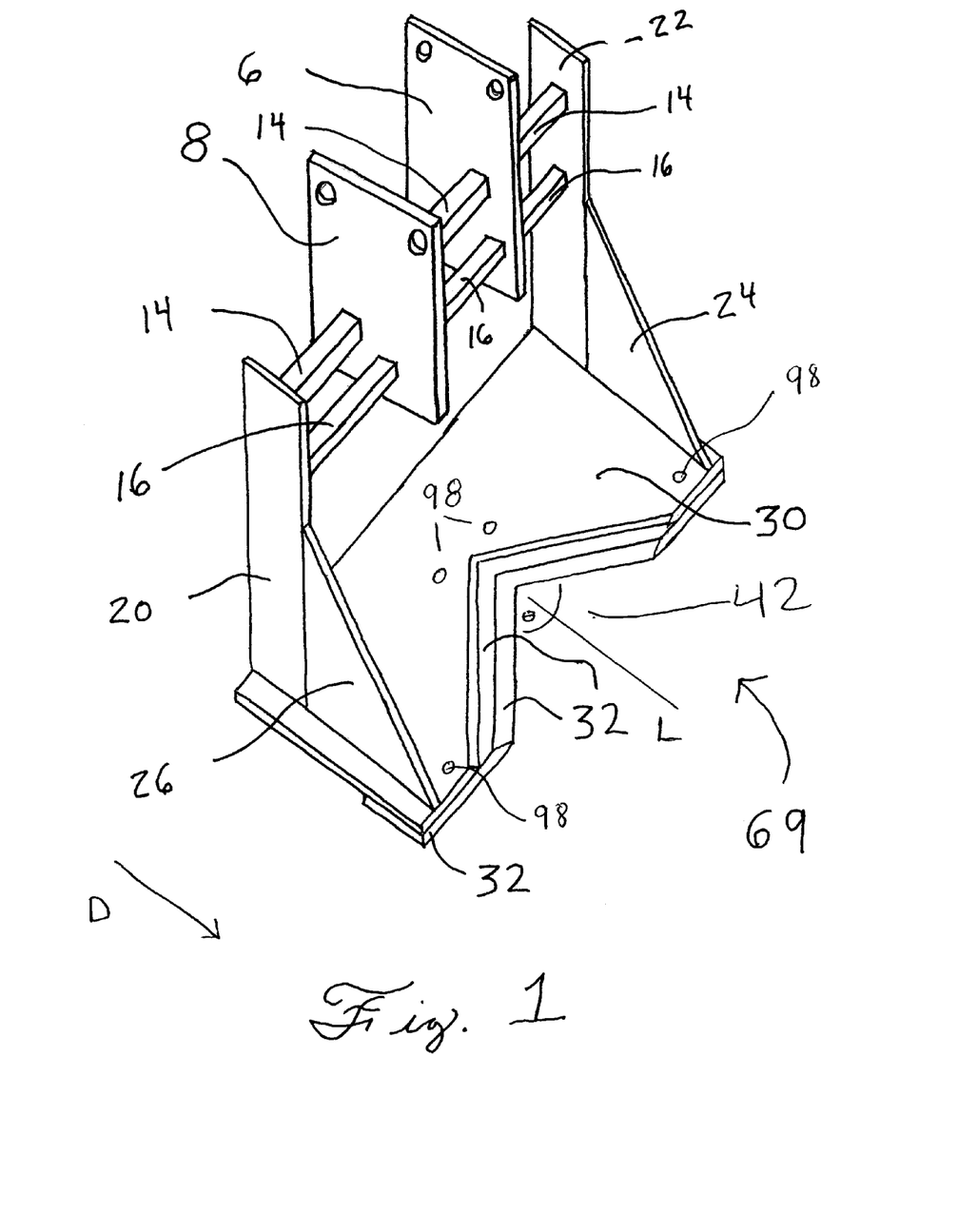
FIG. 1 is a perspective view of a tree or stump removal device according to the invention.

Referring to the drawings, and initially to FIG. 1 there is shown a device according to the invention which is useful for removing trees, stumps, and the like from various landscapes. A device according to the invention is designed be affixed to a piece of earthmoving equipment or other conveyance useful in landscaping, including without limitation, track vehicles, tractors, hydraulic excavators, backhoes, and the like. Once connected to a hydraulic excavator, backhoe, or track vehicle, preferably in the place of a bucket, a device according to the invention is in one operative mode caused to penetrate the ground beneath the ground level and grasp the tap root of a tree, stump, or other growth to be removed and pull the tree or stump including the roots out of the ground by virtue of the motion of the earthmoving equipment or arm to which the inventive device is connected. The present invention does not cut the roots. In another operative embodiment, a device according to the invention includes a plurality of sabre teeth disposed along the leading edge of the device which are suitable for uprooting cedar trees and the like, in which embodiment the device of the invention does not penetrate beneath ground level.

From FIG. 1 it can be seen that a device according to the invention 69 comprises a substantially rectangular, planar base portion 30 having various other components cooperatively connected thereto. The base portion has an upper surface, a lower surface, two long sides, and two short sides. Along the length dimension of the long side, which is the leading side of the device when in use, is a v-shaped void 42. When the invention is employed in its beneath-ground mode, it is this leading edge, by virtue of the sub-base portion later described that contacts and grasps the bulk of the subterranean roots of a tree, stump, or other growth which is desired to be removed. The arrow labeled D shows the direction of travel of a device according to the invention when it is in its intended motion.

Figure 6A:
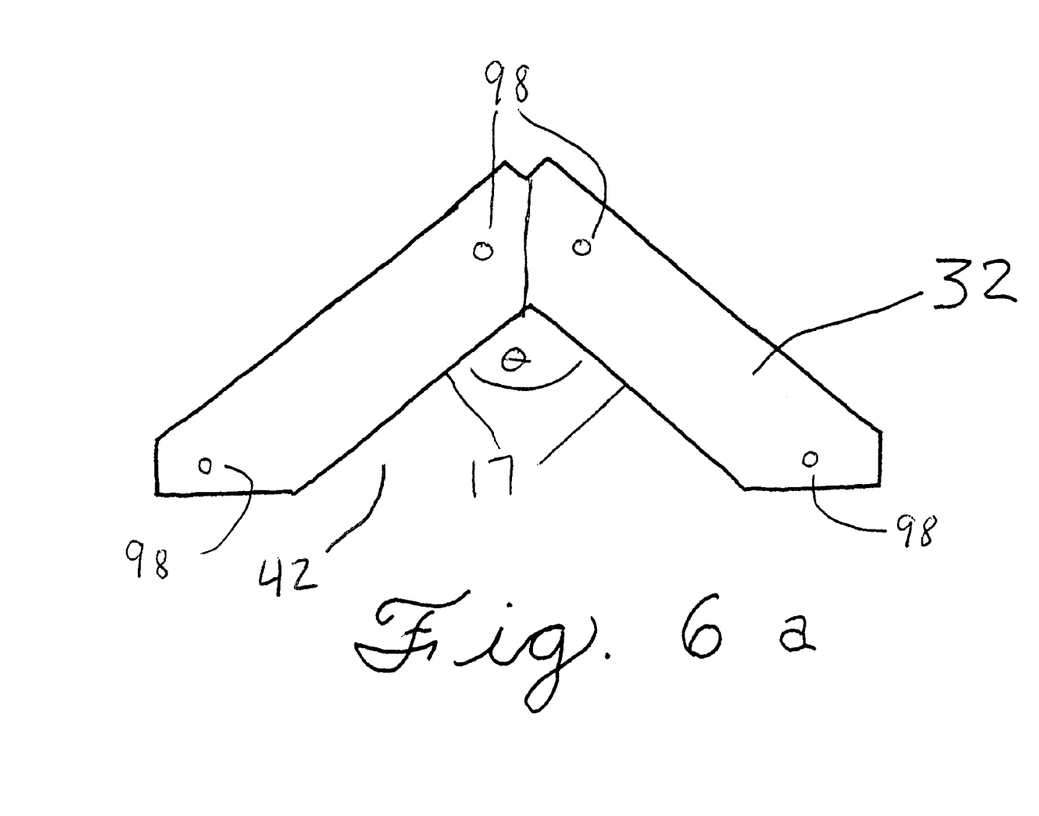
FIG. 6a is a top view of the sub-base member component according to the invention.
Figure 6B:
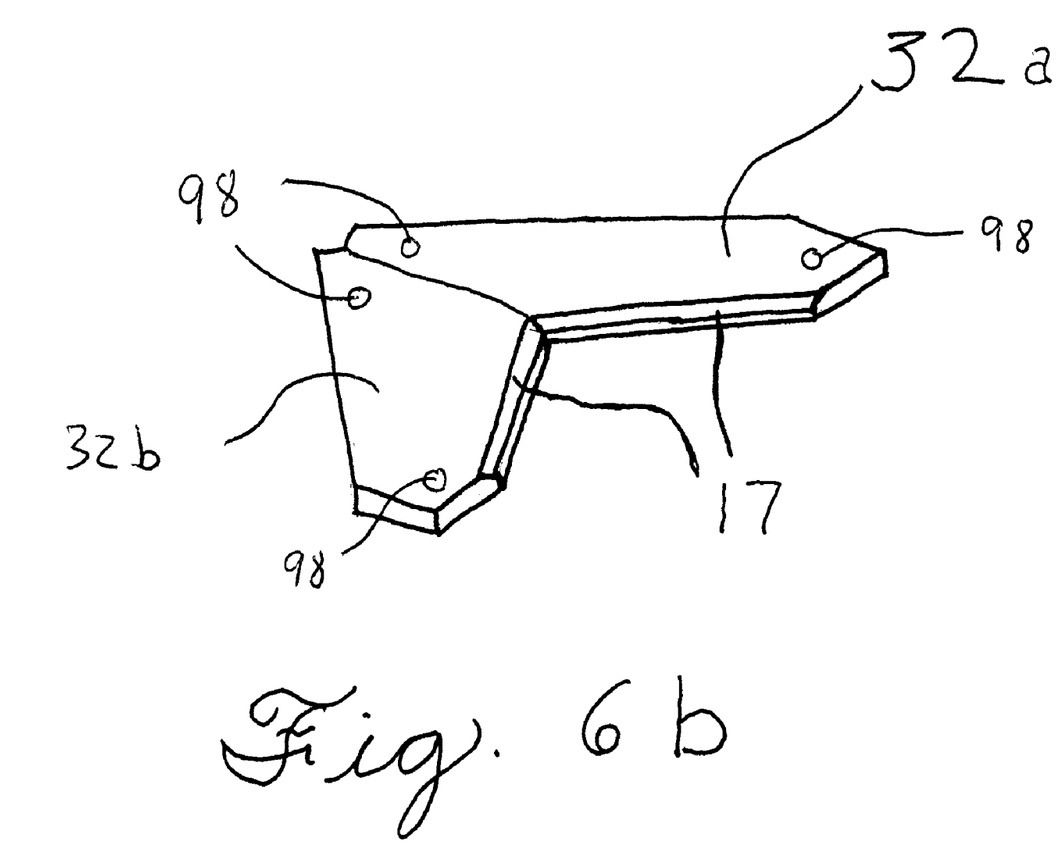
FIG. 6b is a perspective view of the sub-base member component according to the invention.

To the lower surface of the base portion is attached a sub-base portion 32 which is shown in FIGS. 6a and 6b. The sub-base portion includes a v-shaped notch, and is affixed to the lower surface in such fashion that the vertices of the angle in the v-shaped notch of the sub-base portion 32 and base portion 30 are coincident along the line L, as shown in FIG. 1.

The upper surface of the base portion 30 has a first vertical support 20 and a second vertical support 22 which each project upwardly from the upper surface of the base portion. To these vertical supports are connected respectively the first and second end portions of each of a first horizontal support member 14 and a second horizontal support member 16. Disposed about the first and second horizontal support members, are a plurality of mounting means 6 and 8. It is to the mounting means that the arm or other moveable portion of a tractor, backhoe arm, track device or other earth moving equipment may be attached. Preferably, a device according to the invention is mounted instead of an existing bucket on a hydraulic excavator or backhoe, the use of which buckets are well-known in the art. The mounting means 6 and 8 are preferably attached to the horizontal support members by virtue of the horizontal supports passing through holes in each of the mounting means, which holes are slightly larger than the outer contours of the horizontal support members, and the assembly is connected together and stabilized by welds around the holes through which the mounting means ride about the horizontal support members. The cross section of the horizontal support members may be any section selected from round, oval, square, rectangular, hexagonal, etc.

Additional strength is conferred to the device as a whole by the use of reinforcing members 24 and 26, which are generally polygonal in shape having one of their faces affixed to the base portion 30 and another face affixed to the first and second vertical support members 20 and 22, as shown in FIG. 1. The base portion is preferably comprised of 1.0 inch thick steel sheet. While FIG. 1 shows the preferred embodiment in which the reinforcing members 24 and 26 comprise a triangle, other polygonal forms are functionally equivalent and useful in the invention, including squares, rectangles, circles, ovals, pentagons, hexagons, etc. In cases where a circular or oval reinforcing member is employed, the criteria for functionality is that at least a portion of the circumference or outer contour is connectively attached to both the base portion 30 and the vertical support portion to be reinforced.

Figure 2:
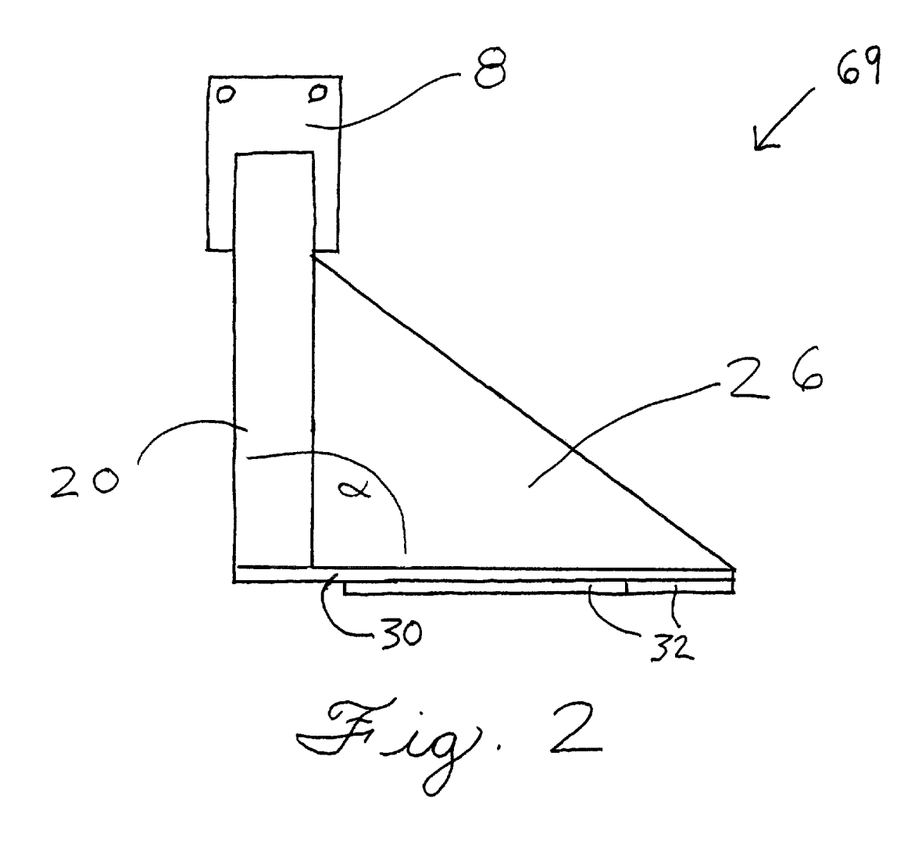
FIG. 2 is a left-side view of a device according to one form or the invention.

FIG. 2 shows a left-side view of a device 69 according to the invention illustrating the spatial relationships of the elements afore described. In FIG. 2 is shown the base portion 30, having the sub-base portion 32 affixed thereto, the vertical support portion 20, mounting means 8, and reinforcing member 26. Also shown in FIG. 2 is the angle α, which is the angle that the vertical support member makes with respect to the upper surface of the base portion 30. In FIG. 2, α is approximately 90 degrees. However, the present invention contemplates the use of any angle in the range of between 45 and 135 degrees for the angle α. It is most preferred that the angle α be about 90 degrees.

Figure 3:
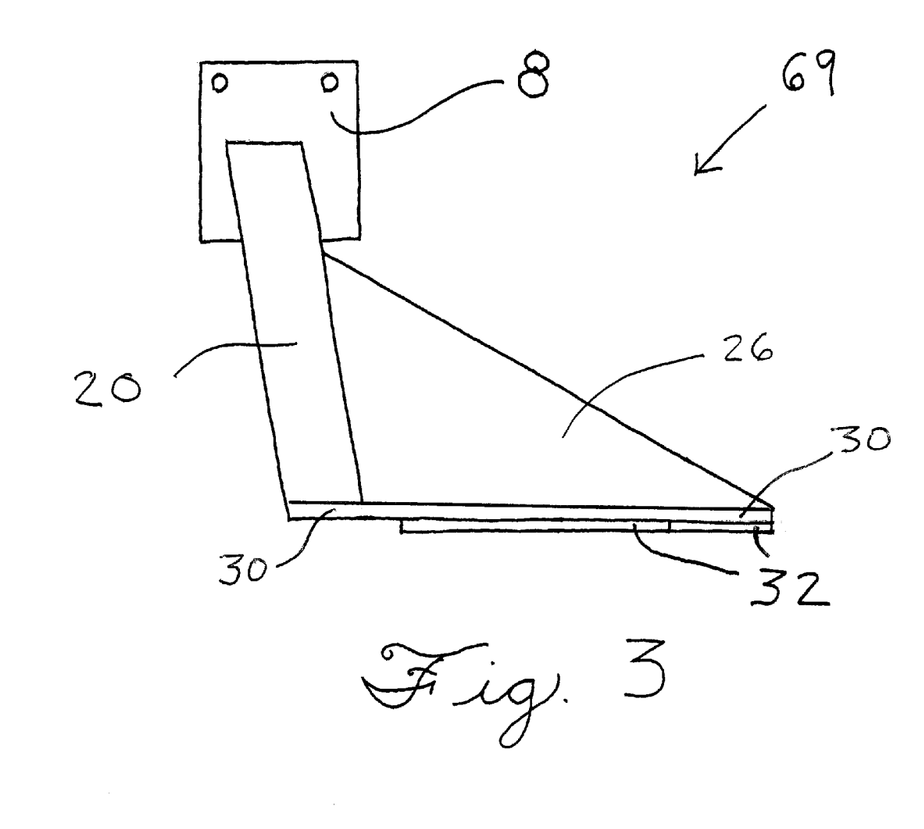
FIG. 3 is a left-side view of a device according to an alternate form or the invention.

FIG. 3 shows a left-side view of a device 69 according to the invention in an alternate embodiment for which the angle α is 100 degrees and illustrating the spatial relationships of the elements afore described. In FIG. 3 is shown the base portion 30, having the sub-base portion 32 affixed thereto, the vertical support portion 20, mounting means 8, and reinforcing member 26.

Figure 4:
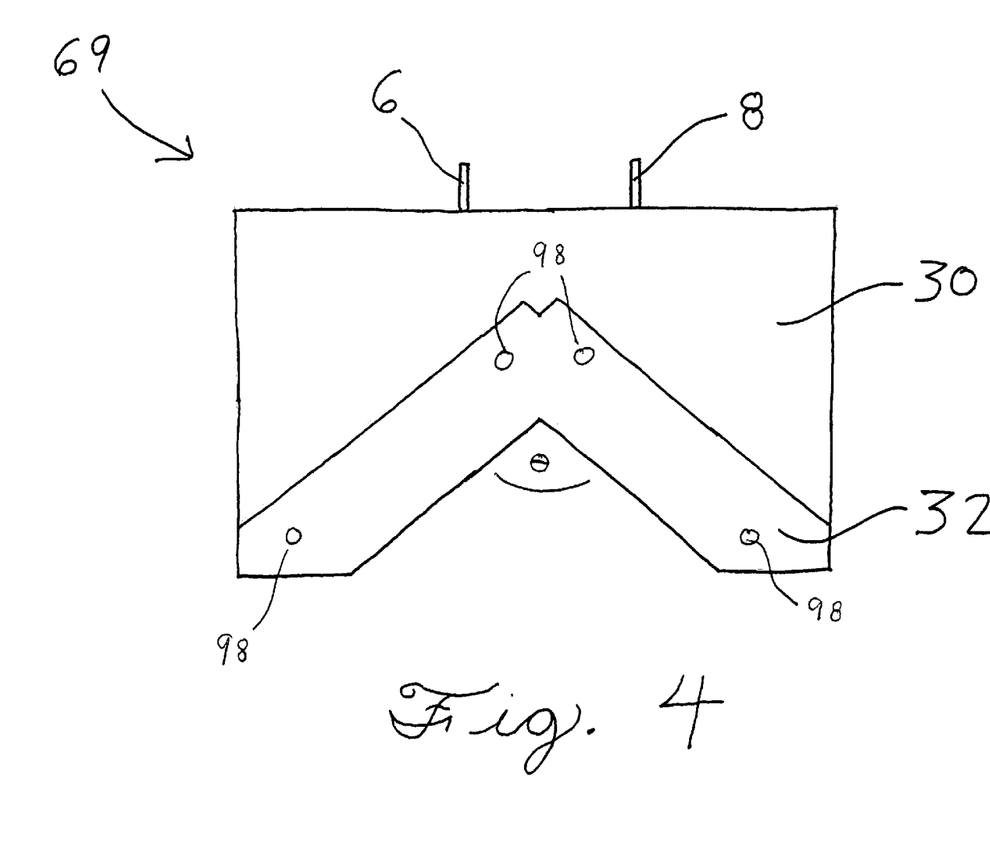
FIG. 4 is a bottom view of a device according to one form or the invention.

FIG. 4 is a bottom view of a device according to the invention 69 showing the spatial relationship of the way in which the sub-base portion 32 is attached to the base portion 30. In this figure is shown the v-shaped notch in the base and sub-base portions, which is defined by the angle θ. Angle θ in the base portion may be any angle in the range between 60 degrees and 120 degrees.

Figure 5A:
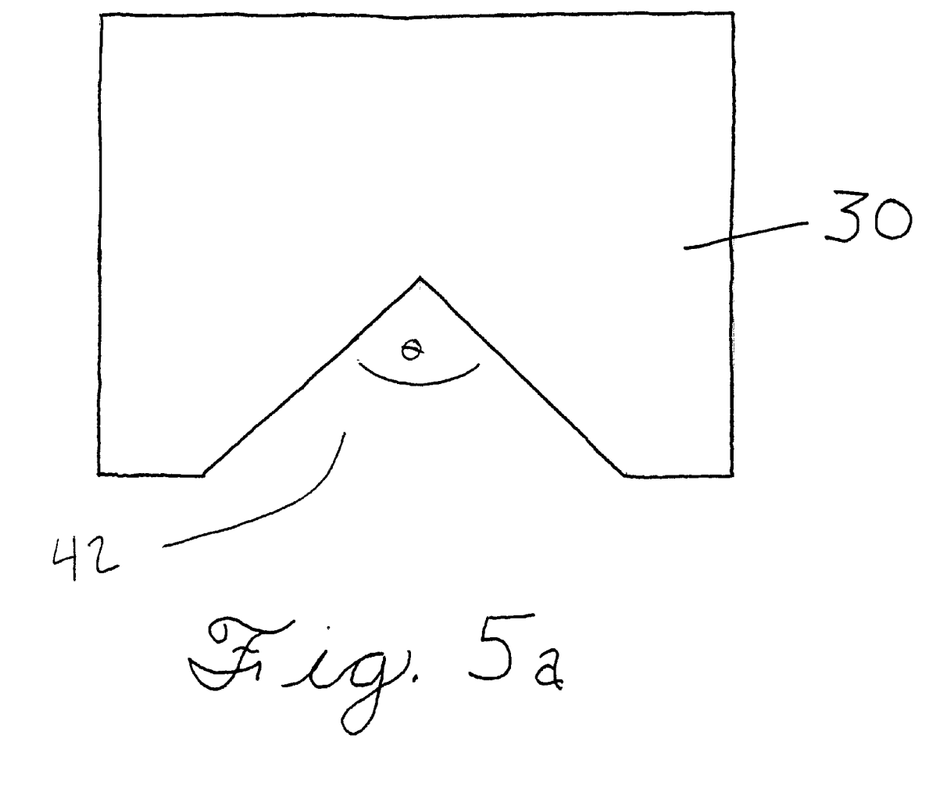
FIG. 5a is a top view of the base portion component according to the invention.
Figure 5B:
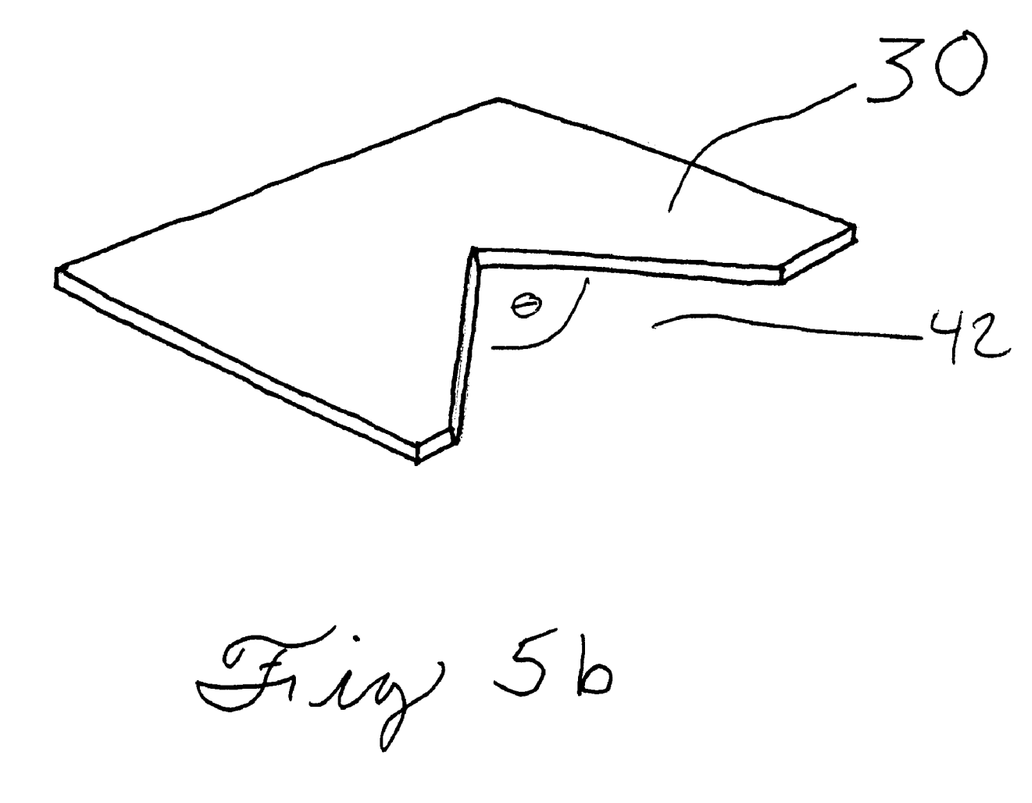
FIG. 5b is a perspective view of the base portion component according to the invention.

FIG. 5a shows the shape of the base portion 30 according to a preferred form of the invention from the top perspective, in which the notch 42 is illustrated. In this figure is shown the v-shaped notch in the base portion, which is defined by the angle θ. Angle θ may be any angle in the range between 60 degrees and 120 degrees. FIG. 5b shows the same base portion 30 in perspective view. In this figure is shown the v-shaped notch in the sub-base portion, which is defined by the angle θ. Angle θ in the sub-base portion may be any angle in the range between 60 degrees and 120 degrees. It is most preferred that the angle θ be 90 degrees in the sub-base portion.

Figure 6C:
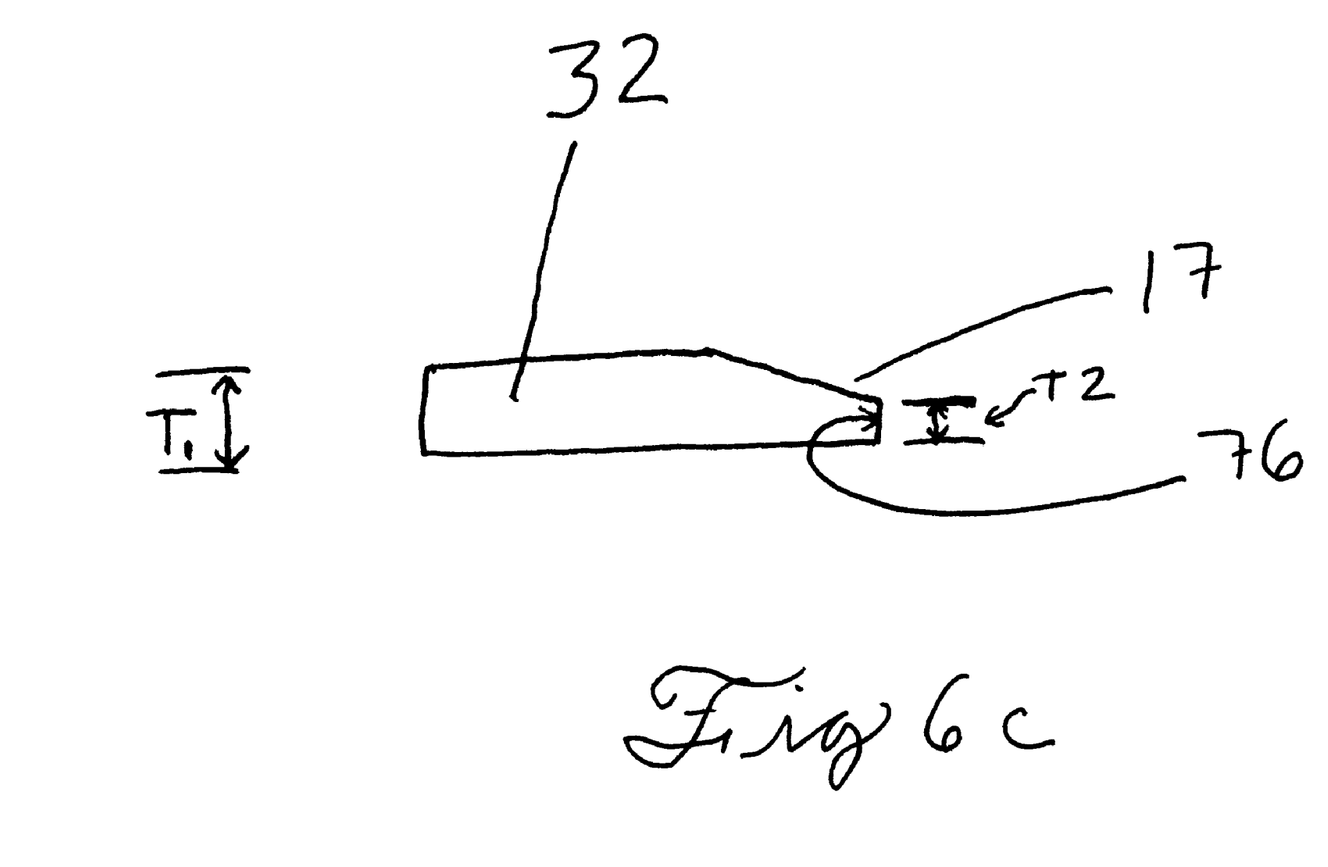
FIG. 6c is an end view of the leading edge portion of the sub-base member component according to the invention.

FIG. 6a shows the shape of the sub-base member 32 according to a preferred form of the invention from the top perspective, in which the notch 42 is illustrated. FIG. 6b shows the same sub-base member 32 in perspective view. Also shown is the contour of the leading edge portion 17, whose contour is more clearly shown in FIG. 6c. In this side cutaway view of a section of the leading edge portion 17 of the sub-base member 32 it is seen that the leading edge is not knife-shaped, but has a blunt face portion 76 which is the first edge to come into contact with the earth or tree material being removed when a device according to the invention is set into its intended functional motion, indicated by the arrow labeled D in FIG. 1. The purpose of the blunt face portion is to preclude a device according to the invention from cutting any roots, and to enable it to grasp firmly a substantial portion of the roots of a tree or stump being removed to enable the growth to be effectively ripped out of the ground completely by virtue of the motion of the earth moving equipment, tractor, etc. to which a device according to this invention is connected. The preferred thickness T1 of the sub-base portion is about 1.0 inches, although any thickness in the range of between about 0.25 inches and 2.0 inches are contemplated herein. The dimension T2 of the blunt face portion should be at least 0.125 inches, with at least 0.25 inches being more preferable. It is most preferred that the dimension T2 of the blunt portion is 0.50 inch, although lengths of this element greater than 0.50 inch are useful in accordance with the invention. Thus, the present invention includes configurations for which T2 is any length between 0.125 inches and 2.00 inches, including every thousandth inch therebetween. It is clear from FIG. 6c that the blunt face portion 76 intersects the longest dimension of the cross sectional view of the sub base portion 32 at an angle of about 90 degrees. It is within the scope of the present invention to provide a sub-base portion having a leading edge whose cross section includes a blunt face portion that intersects this longest dimension (as viewed from cross section) at angles other than 90 degrees, including without limitation, any angle in the range of between about 45 degrees and 135 degrees, with the proviso that the leading edge portion must not be rendered capable of actually cutting roots when in use.

Figure 7A:
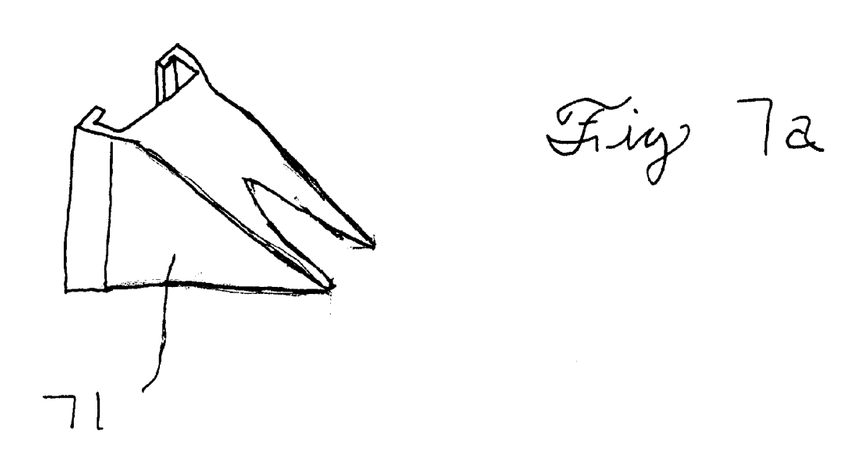
FIG. 7a is a perspective view of a sabre tooth useful in accordance with the invention.
Figure 7B:
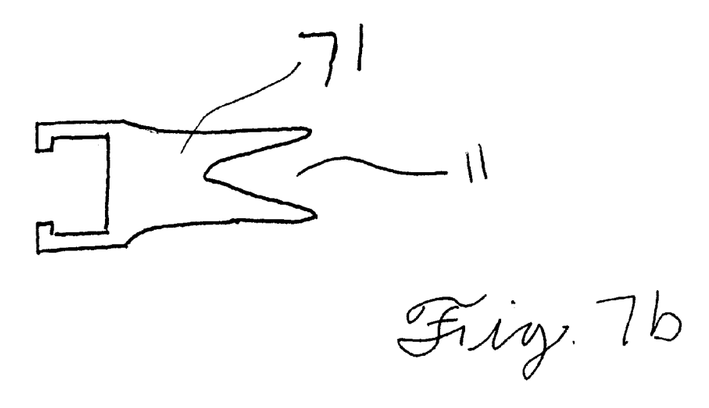
FIG. 7b is a top view of a sabre tooth useful in accordance with the invention.

FIGS. 7a and 7b each respectively show a perspective and a top view of a conventional sabre tooth grasping devices which is useful in combination with a device according to the invention when the device is used in removing small cedar trees and the like. The sabre tooth includes a grasping void 11 into which the shank of a small tree may be caused to enter. Then, by the motion of the device as a whole by actuation of a lever arm to which the device is attached, or by motion of the conveyance, the small tree may be torn from the earth. Although shown in this one embodiment, other functionally equivalent sabre teeth are useful in a combination according to the invention, with the proviso that such sabre teeth must be capable of receiving the shank or trunk of the tree which is desired to be removed.

Figure 8:
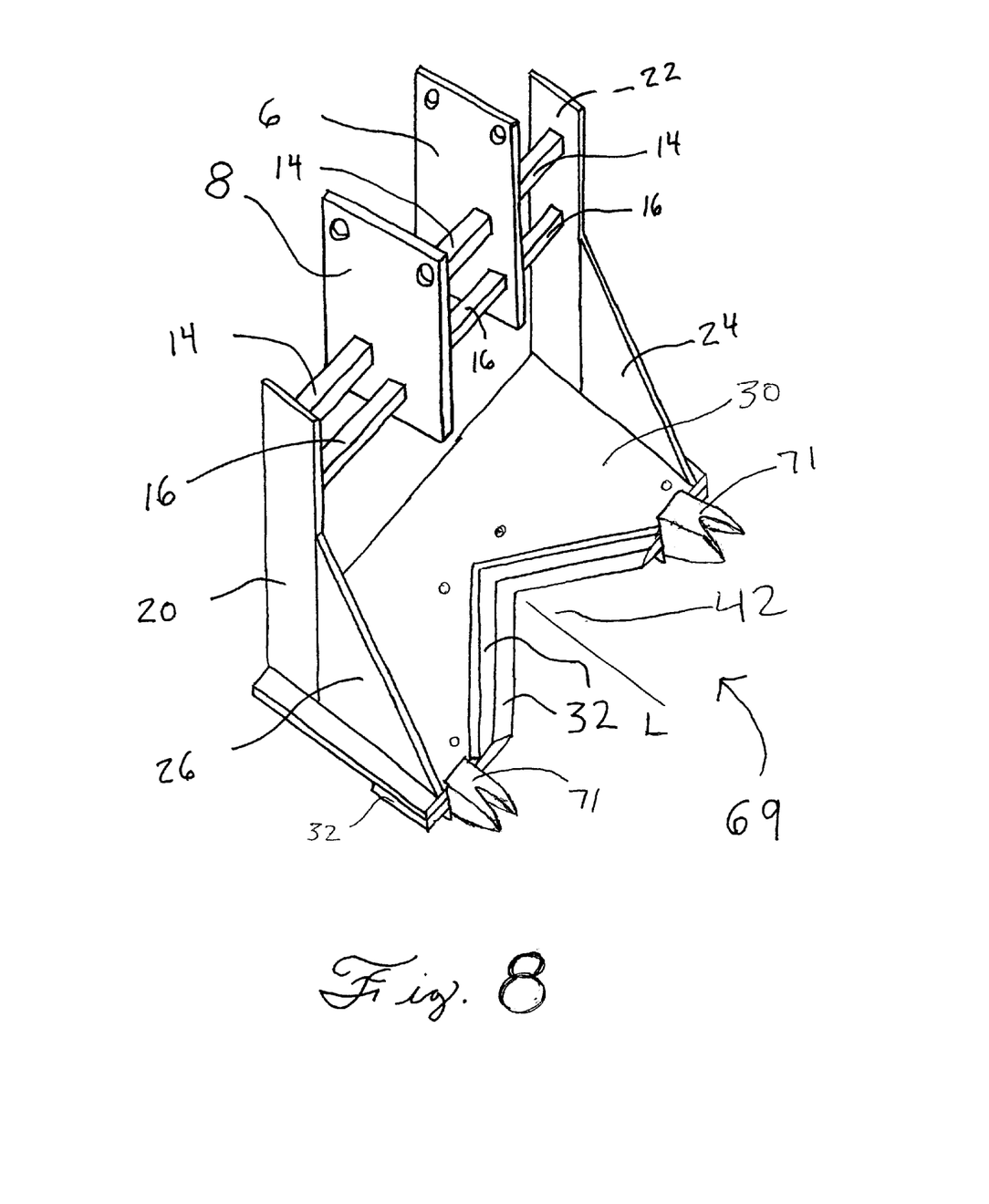
FIG. 8 is a device according to the invention having a plurality of sabre tooths attached in their preferred locations.

FIG. 8 shows a preferred employment of a pair of sabre teeth in accordance with the invention. Preferably, the sabre teeth are affixed by conventional means at the end portions of the long sides the device adjacent to, but not within, the v-shaped void, as shown in FIG. 8. In such an embodiment, a device according to the invention is rendered functional to remove small cedar trees and the like by grasping the trees by their shank and tearing them from the ground.

The present invention advantageously functions to grasp a substantial portion of the roots of a tree, bush, shrub, or the like that is desired to be removed from the earth and tear the whole tree, bush, shrub, or the like from the earth by virtue of enabling the roots of such flora to be maintained as one continuous mass, whose overall structural integrity remains essentially unchanged by virtue of its being contacted with a device according to the invention. This is in sharp contrast to the devices of prior art, whose function has thus far been to cut such roots by virtue of its contacting them. The blunt portion 76 is responsible for this function.

During the normal course of use of a device provided in accordance with the invention, the blunt portion 76 is eventually worn until the leading edge portion 17 becomes sufficiently sharp to enable it to cut the roots of undesirable flora. At such time that the roots of flora are beginning to be cut by the action of a device according to the invention upon them, the sub-base portion 32 must be changed or replaced with a fresh sub-base portion having a sufficient blunt 76 to preclude the cutting of roots by the leading edge portion 17 of the device as a whole. Alternatively, the leading edge portion 17 of the sub-base portion 32 may be ground using a portable grinder, filing, etc. until a sufficient blunt exists to preclude cutting of roots by the action of the device. In addition, through normal use the sub-base portion 32 may be caused to become thinner by the action of the ground rubbing against it, thus eventually necessitating its replacement. In one preferred form of the invention, the sub base portion 32 is affixed to the base portion 30 by means of conventional fasteners situated in holes 98 in each of said base portion and sub-base portion which allow the quick replacement of the sub-base portion 32. In one preferred form of the invention, the sub-base portion 32 is composed of two portions 32a and 32b as shown in FIG. 6B.

The materials of construction of the elements of a device according to the present invention include preferably metals or alloys of metals, with steel stock being most preferred. Any method of joining metal parts to one another known to those skilled in the art may be used in joining the various elements of the invention to provide a device according hereto, including nuts and bolts, rivets, other fasteners, etc.; however, it is most preferred that the elements of the invention are connected to one another by welds.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. Accordingly, the presently disclosed invention is intended to cover all such modifications and alterations, and is limited only by the scope of the claims which follow.

What is claimed is:

1. A device useful for removing trees and stumps from the earth which comprises:
  a) a substantially rectangular, planar base portion having an upper surface, a lower surface, a first long side which is the leading side, and a second long side which is the trailing side, and comprising a single v-shaped void disposed along the length of said leading side;
  b) a sub-base member attached to said lower surface of said base portion, said sub-base member including a v-shaped void, and a leading edge portion which includes a blunt portion which renders said leading edge portion sufficiently dull to preclude the cutting of roots by said leading edge portion;
  c) a first vertical support portion projecting upwardly from said upper surface of said base portion;
  d) a second vertical support portion projecting upwardly from said upper surface of said base portion;
  e) a first horizontal support member having a first end portion and a second end portion, wherein the first end portion of said first horizontal support member is attached to said first vertical support portion and wherein the second end portion of the first horizontal support member is attached to said second vertical support portion;
  f) a second horizontal support member having a first end portion and a second end portion, wherein the first end portion of said second horizontal support member is attached to said first vertical support portion and wherein the second end portion of the second horizontal support member is attached to said second vertical support portion; and
  g) mounting means attached directly to both of said first and said second horizontal support members, wherein said mounting means is adapted to be coupled to earthmoving equipment.

2. A device as in claim 1 further comprising:
  h) a first reinforcing member in the shape of a polygon having a plurality of faces that is attached to said first vertical support portion along one of its faces and that is attached to said base portion along one of its faces.

3. A device as in claim 2 further comprising:
  i) a second reinforcing member in the shape of a polygon having a plurality of faces that is attached to said first vertical support portion along one of its faces and that is attached to said base portion along one of its faces.

4. A device as in claim 2 wherein said polygon is selected from the group consisting of: triangle, square, rectangle, circle, pentagon, and hexagon.

5. A device as in claim 1 wherein the angle which said first vertical support portion makes with respect to said base portion is any angle in the range of between about 45 degrees and 135 degrees.

6. A device as in claim 1 wherein the angle which said first vertical support portion makes with respect to said base portion is any angle in the range of between about 70 degrees and 110 degrees.

7. A device as in claim 1 wherein the angle which said first vertical support portion makes with respect to said base portion is any angle in the range of between about 80 degrees and 100 degrees.

8. A device as in claim 1 wherein said mounting means comprises a plurality of substantially planar plates arranged parallel to one another and disposed about said first and said second horizontal support members between said first and said second vertical support portions.

9. A device as in claim 5 wherein said mounting means comprises a plurality of substantially planar metal plates arranged parallel to one another and disposed about said first and said second horizontal support members.

10. A device as in claim 8 wherein said sub-base member includes a two leading edge portions which intersect to form the shape of a V, and wherein said leading edge portions each include a blunt face portion.

11. A device as in claim 10 wherein the leading edge portions of the sub-base member intersect to form an angle having any value in the range of 120 degrees to 60 degrees.

12. A device as in claim 10 wherein the leading edge portions of the sub-base member intersect to form an angle having any value in the range of 100 degrees to 80 degrees.

13. A device as in claim 1 further comprising:
   h) a sabre tooth affixed to an end portion of the leading side of the base portion of the device adjacent to said v-shaped void.

14. A device as in claim 2 further comprising:
   i) a sabre tooth affixed to an end portion of the leading side of the base portion of the device adjacent to said v-shaped void.

15. A process for removing a tree, root, or stump comprising the steps of:
   a) providing a device according to claim 1 attached to a hydraulic excavator;
   b) conferring motion on said device so as to cause it to move beneath the surface of the earth so that said v-shaped void contacts the roots of a tree or stump;
   c) continuing said motion until said roots are loosened substantially; and
   d) causing said device to emerge from the surface of the earth.

16. A process for removing a tree, root, or stump comprising the steps of:
   a) providing a device according to claim 2 attached to a hydraulic excavator;
   b) conferring motion on said device so as to cause it to move beneath the surface of the earth so that said v-shaped void contacts the roots of a tree or stump;
   c) continuing said motion until said roots are loosened substantially; and
   d) causing said device to emerge from the surface of the earth.

17. A process for removing a tree, root, or stump comprising the steps of:
   a) providing a device according to claim 13 attached to a hydraulic excavator;
   b) conferring motion on said device so as to cause it to move beneath the surface of the earth so that said v-shaped void contacts the roots of a tree or stump;
   c) continuing said motion until said roots are loosened substantially; and
   d) causing said device to emerge from the surface of the earth.

18. A process for removing a tree, root, or stump comprising the steps of:
   a) providing a device according to claim 14 attached to a hydraulic excavator;
   b) conferring motion on said device so as to cause it to move beneath the surface of the earth so that said v-shaped void contacts the roots of a tree or stump;
   c) continuing said motion until said roots are loosened substantially; and
   d) causing said device to emerge from the surface of the earth.

* * * * *